June 14, 1960  S. R. THOMPSON  2,940,278
DEFROSTING CONTROL
Filed May 14, 1957
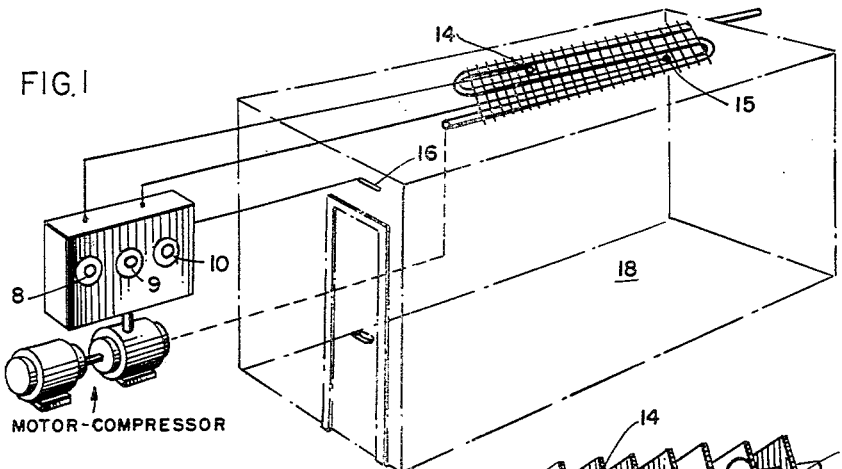
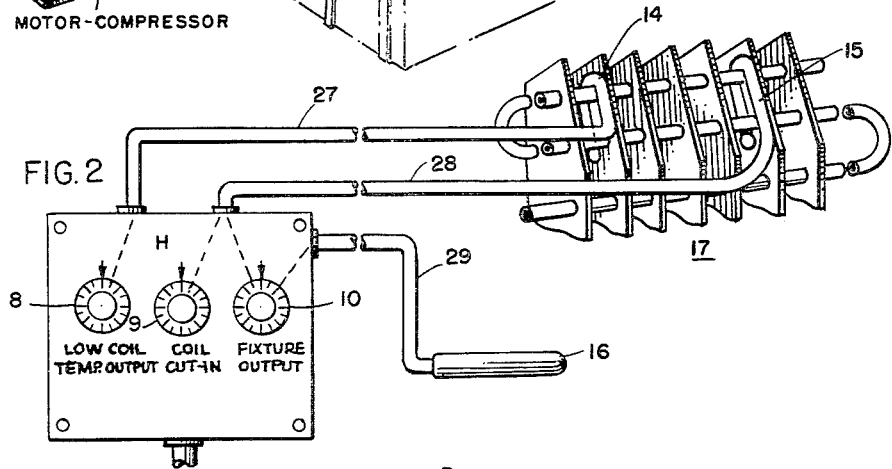
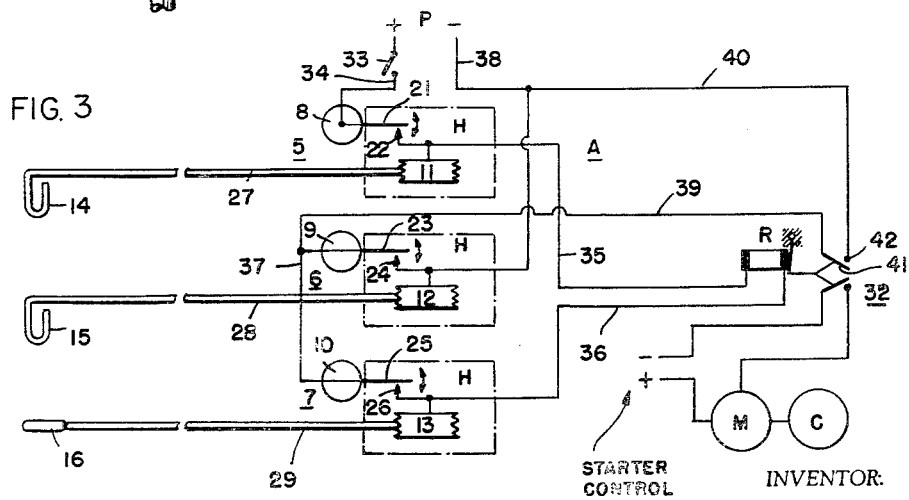
INVENTOR:
SELMAR RAYMOND THOMPSON
BY
ATT'YS United States Patent Office 2,940,278
Patented June 14, 1960

2,940,278

DEFROSTING CONTROL

Selmar Raymond Thompson, 1107 North Shore Ave., Chicago, Ill.

Filed May 14, 1957, Ser. No. 659,135

7 Claims. (Cl. 62—163)

This invention relates to improvements in defrosting controls for evaporators. The main objects of this invention are to provide an improved automatic defrosting control for evaporators; to provide an improved evaporator defrosting control the automatic operation of which is determined by the relative temperature conditions between spaced points on the evaporator and of the ambient air; to provide an improved evaporator defrosting control of this kind manually adjustable to vary the relative temperature conditions at which the automatic defrosting occurs; and to provide an improved automatic evaporator defrosting control of this kind which is so simple in its construction and operation as to make its manufacture very economical, its installation most facile, and its functioning highly efficient.

One specific embodiment of this invention is shown in the accompanying drawings; in which:

Figure 1 is a perspective schematic of this improved defrosting control as applied to a walk-in type of refrigerator;

Fig. 2 is a diagrammatic view showing the relative positioning of the temperature-sensitive instruments on and relative to an evaporator and their connections to the dial-controlled switch mechanisms; and Fig. 3 is a diagram of the circuit arrangement with the several switches which are actuated by temperature-sensitive instruments for effecting the defrosting cycle.

The essential concept of this invention involves a circuit arrangement including a relay switch, for regulating the operation of a refrigerant-producing unit, the circuit being controlled by a series of three switch mechanisms automatically actuated by thermal-motors through the medium of temperature-sensitive instruments two of which instruments are positioned in predetermined spaced contactual relationship with an evaporator and a third of which instruments is exposed to the ambient air in the vicinity of the evaporator but spaced a distance therefrom, whereby the periodic defrosting of the evaporator is automatically determined by the relative temperature conditions to which the three temperature-sensitive instruments are subjected.

A temperature-influenced, thermal-motor, switch-controlled circuit arrangement A, leading from a source of power P to a relay R, embodying the foregoing concept includes three switch mechanisms 5, 6, and 7, manually settable by dial elements 8, 9, and 10 and automatically actuated by thermal motors 11, 12, and 13 controlled by temperature-sensitive instruments 14, 15, and 16 so associated with an evaporator 17 as to effect such an automatic, periodic defrosting thereof as will insure a minimal variation of optimum-temperature conditions designed for a refrigerator 18, especially of the walk-in type.

The specifically-distinctive feature of this defrosting control is the second temperature-sensitive instrument 15 positioned on the evaporator 17 rearwardly of the instrument 14, located on the evaporator 17 nearest the point of entrance of the refrigerant thereto, and operates the switch mechanism 6. This second instrument 15 and the interposition of its related switch mechanism 6 in the circuit A insures an effective and automatic defrosting cycle in the refrigerator 18, as will be subsequently set forth fully.

The switch mechanisms 5, 6, and 7 may be any conventional type providing for relatively movable pairs of contacts 21–22, 23–24, 25–26 respectively. The adjusting dial elements 8, 9, and 10 comprise graduated disks secured to knobbed pins mounting cams (not shown) positionable for regulating the point at which the make and break is made between the respective contacts to open and close the circuit A to the relay R. The dial elements are journaled externally on a housing H wherein are located the thermal-motors 11, 12, and 13 and their coordinated switch mechanisms 5, 6, and 7 and the relay R.

The thermal motors 11, 12, and 13 here are shown as Sylphon bellows type operatively connected to the respective temperature-sensitive, capillary-type instruments 14, 15, and 16 through the tubes 27, 28, and 29. It should be understood, however, that an embodiment of this invention is not limited to the use of Sylphon bellows or the capillary-type instruments. Any other type of thermal-motor and temperature-sensitive instrument could be used with equal facility.

The evaporator 17 here is shown only as a section of the finned-tube-coil type with the temperature-sensitive instruments 14 and 15 wrapped around two or more of the coils at spaced points longitudinally thereof. As indicated in Fig. 1, such an evaporator 17 is suspended in the refrigerator 18. A blower (not here shown) would be positioned to circulate air across the evaporator 17 and within the refrigerator 18. The evaporator 17 is connected to a refrigerant-producing unit MC with an interposed condenser (not here shown).

The relay R is a conventional, solenoid-type motor, the armature of which actuates a single throw double pole switch 32.

As is well understood, in refrigerators of the type for which this defrost control is especially adapted for use, the purpose is to maintain an interior temperature sufficient to preserve the products—usually food—in a condition which will preclude the development of decaying bacteria. Such a temperature normally might range between average of 30 to 50 degrees Fahrenheit. Obviously, such an interior temperature requires a refrigerant flow through the evaporator 17 at a temperature below freezing, generally in the range between 0–30 degrees. The inevitable result is the formation of frost on the evaporator coil and fins which must be removed periodically to insure a constantly efficient operation of the refrigerant-producing unit.

The formation of ice on the evaporator usually begins at the end nearest the entrance of the refrigerant, the end adjacent which usually is located the blower which circulates the air around the evaporator 17 and through the refrigerator 18. The continued operation of the refrigerant-producing unit, without periodic defrosting of the evaporator, would allow an excessive accumulation of frost and ice on the evaporator resulting in an inefficient operation of the refrigerant-producing unit MC.

To defrost the evaporator 17, there must be periods of idleness of the refrigerant-producing unit MC of such duration as to allow the temperature of the tube coil and fins to rise and be maintained temporarily above freezing. The object of the instant disclosure is to have this occur with such frequency and be of limited duration as to have the minimum opportunity for the interior temperatures of the refrigerator to rise above optimum required to most effectively preserve the contents of the refrigerator. It is to the most facile attainment of that objective that the herein-shown and explained assembly of the three temperature sensitive instruments 14, 15, and 16 and their respectively-actuated switch mechanisms 5, 6, and 7 has been designed.

The manner in which that objective is attained by this arrangement of temperature-sensitive instruments and actuated switch mechanisms will be appreciated more fully by explaining first the functioning of the previous conventional use of the two temperature-sensitive instruments 14 and 16 and their related switch mechanisms 5 and 7 for causing the operation of the refrigerant-producing unit MC. In such a conventional arrangement, when the temperature-sensitive instrument 16 registers a temperature below the set optimum for the interior of the refrigerator 18, the switch mechanism 7 is opened and the refrigerant-producing unit MC becomes idle. On the other hand, if the temperature-sensitive instrument 14 registers a temperature below the set optimum for the temperature of the refrigerant flow through the evaporator 17, the switch mechanism 5 will be locked-out and/or opened and the refrigerant-producing unit MC will become idle.

As the temperature, to which either of these instruments 14 or 16 is exposed, rises, the instruments would effect a closing of the related switch mechanisms 5 and 7 and restore the operation of the refrigerant-producing unit MC. It should be noted, however, that in such previously-used arrangement the opening of one of the two switch mechanisms 5 and 7 will idle the refrigerant-producing unit. But, it requires the closing of both of the switch mechanisms to effect the operation of the refrigerant-producing unit MC. Moreover, it should be noted that in such an arrangement there is no provision for defrosting. That has to be achieved by some auxiliary means.

The arrangement of this second temperature-sensitive unit 15 on the evaporator 17, at a point rearwardly from the instrument 14, and the interposition of the companion thermal-controlled switch mechanism 6 between the switch mechanisms 5 and 7, effects a delayed restoration of the operation of the refrigerant-producing unit MC to permit an interim automatic defrosting of the evaporator 17.

Following is an explanation of the operation of the hereinshown second temperature-sensitive-instrument 15 on the evaporator, and its related switch mechanisms 6, as coordinated with the other instruments 14 and 16 and their related switch mechanisms 5 and 7.

Assume the dial elements 8, 9, and 10 are set so that the temperature-sensitive instruments 14, 15, and 16 actuate their respective switch mechanisms 5, 6, and 7 when the instruments register temperatures noticeably variant from 10, 34 and 36 degrees Fahrenheit. Assume, also, that the refrigerator 18 is at normal room temperature and the refrigerant-producing unit MC is to be started to lower interior temperature of the refrigerator to not in excess of 36 degrees. With the refrigerator 18 at normal room temperature, all three switch mechanisms 5, 6, and 7 would be closed. Upon closing the "off" and "on" switch 33, the circuit A will be rendered active, resulting in a flow of current to energize the relay R and cause a closing of the switch 32 and thereby effect a starting of the refrigerant-producing unit MC.

The flow of current through the circuit A, from the plus to the minus terminals of the source of power P, will be as follows: Line 34, switch contacts 21—22, line 35, relay R, line 36, switch contacts 26—25, line 37, switch contacts 23—24, and line 38. Such current flow will continue until the instrument 15 registers a temperature below 34 degrees, at which time the thermal-motor 12 will be actuated to open the switch mechanism 6.

However, the opening of the switch mechanism 6 will not cut off the current flow through the relay R, and arrest the operation of the refrigerant-producing unit MC. This is for the reason that the closing of the relay switch 32 establishes a parallel current flow from the line 37 through line 39, switch contacts 41—42 (switch 32), line 40 to line 38. Hence, the unit MC will continue to operate until either the temperature-sensitive instrument 14 registers under 10 degrees, a condition known in the trade as "frost locked," or the instrument 16 registers under 36 degrees. When one or the other such instruments so registers below its preset optimum temperature, the circuit A to the relay R will be opened and the unit MC will cease to operate.

By reason of the below-freezing refrigerant flow through the evaporator 17, the moisture in the air, being circulated over the evaporator 17, begins to form a constantly-increasing coating of frost on the tubes and fins of the evaporator. Such frost formation will continue so long as the temperature of the tubes and the fins remains below 32 degrees. Forming first on the forward portions of i.e. nearest the entrance of the refrigerant thereto the evaporator 17, the constantly-enlarging coating of frost tends to extend more and more rearwardly on the evaporator. Eventually a heavy coating of the frost would cover the entire evaporator—in fact would become a block of ice—if no provision were made for periodic defrosting.

Such a coating of frost constitutes an insulation over those parts of the evaporator on which it collects. This lessens the effective dissipation of cold from the refrigerant flowing through the tubes. The more rapidly and extensively the frost collects the more the temperature of the air in the refrigerator 18 tends to rise and increase the demand for refrigerant flow through the evaporator. Hence, the need for a frequent and periodic defrosting of the evaporator 17.

Since the more rearward section of the evaporator 17 will be subject to a slightly cold refrigerant flow, the frost coating on that section will be delayed over the frost formation on the forward section of the evaporator. Therefore, this rear section of the evaporator will be subject to the temperature of the ambient air of the refrigerator. It is to be noted that the temperature-sensitive instrument 15, located in this more rearward section of the evaporator 17, is set to be open for a temperature just above freezing, a temperature much higher than that for which the forward instrument 14 is set to open and close its related switch mechanism 5. Also, it is to be noted that once the refrigerant-producing unit MC has been idled, by the opening of either the switch mechanism 5 or 7, (controlled by dials 8 and 9) the closing of both such switch mechanisms 5 and 7 will not reestablish the operation of the unit MC, so long as the temperature-sensitive instrument 15 maintains its related switch mechanism 6 open. Switch mechanism 6 will remain open until the temperature-sensitive instrument 15 registers a temperature above that for which its dial element 12 has been set, a few degrees above freezing.

Thus, so long as the temperature-sensitive instrument 15 is holding the switch mechanism 6 open, the evaporator 17 is being subjected to the modifying temperature of the ambient refrigerator air, several degrees above freezing. During that period of time the frost on the evaporator will be melting—more readily at the rearward section where there is less accumulation of frost. As soon as there has been a sufficient decrease in the frost on the rearward section of the evaporator 17 to allow the temperature-sensitive instrument 15—subject to the temperature of the refrigerator air—to register a temperature above its preset temperature (34 degrees), the switch mechanism 6 will be closed. Then, and only then, will the closing of the two switch mechanisms 5 and 7—by reason of the temperature conditions of the two instruments 14 and 16—reestablish the operation of the refrigerant-producing unit MC.

So long as all three switch mechanisms 5, 6 and 7 remain closed the unit MC will continue operation. The unit will cease operation when the flow of refrigerant through the evaporator 17 has caused one or the other—or both—of the instruments 14 and/or 16 to register the temperatures below or above those for which their respective dial elements 11 and 13 have set the respective switch mechanisms 5 and 7. When one or the other of such switch mechanisms opens circuit A the unit MC will again become idle.

The instrument 14 may thus be aptly described as an auxiliary emergency lock-cycle defroster to prevent operation of the motor-compressor when the temperature about the instrument is below the predetermined setting of the switch 5.

Thus, it will be seen that this third temperature-sensitive instrument 15 located on the rearward section of the evaporator 17—and its coordinated switch mechanism 6—delays the resumption of the operation of the refrigerant-producing unit MC, after each idle period, long enough to permit a material defrosting of the evaporator 17; enough defrosting to allow the temperature-sensitive instrument 15 to register a temperature condition for that section of the evaporator 17 a few degrees above freezing.

Although but one specific embodiment of this invention is herein shown and described, it will be understood that numerous details of the construction shown may be altered or omitted without departing from the spirit of the invention as defined by the following claims.

I claim:

1. A defrosting control comprising, a single unit evaporator located in a refrigerating chamber, a circuit for connecting a source of power with a refrigerant-producing unit, three independently operable switch mechanisms, a thermal motor connected to actuate each of the switch mechanisms, three temperature-sensitive instruments connected to the respective thermal motors two of which instruments are contactually positioned at spaced points on an evaporator and the third positioned adjacent the evaporator, a relay switch the motor of which is so connected in series with all three switches and the relay switch as to be energized by the concurrent closing of all three switches and subsequently maintained energized by the concurrent closing of the relay switch and two of the three switches in the event of a subsequent opening of one of the three switches actuated by the thermal motor connected with one of the two contactually-positioned instruments and manually-adjustable means for predetermining the relative temperature conditions in the refrigerator at which the instruments will respectively effect the operation of the switch mechanisms for controlling the operation of the refrigerant-producing unit.

2. A defrosting control comprising, a single unit evaporator located in a refrigerating chamber, a circuit for connecting a source of power with a refrigerant-producing unit, three independently operable switch mechanisms, a thermal motor connected to actuate each of the switch mechanisms, three temperature-sensitive instruments connected to the respective thermal motors two of which instruments are contactually positioned at spaced points on an evaporator and the third positioned adjacent the evaporator, a relay switch the motor of which is so connected in series with all three switches and the relay switch as to be energized by the concurrent closing of all three switches and subsequently maintained energized by the concurrent closing of the relay switch and two of the three switches in the event of a subsequent opening of one of the three switches actuated by the thermal motor connected with one of the two contactually-positioned instruments an auxiliary circuit controlled by the relay switch for neutralizing one of the three switch mechanisms with respect to the other two, and manually-adjustable means for predetermining the relative temperature conditions in the refrigerator at which the instruments will respectively effect the operation of the switch mechanisms for controlling the operation of the refrigerant-producing unit.

3. A defrosting control comprising, a single unit evaporator located in a refrigerating chamber, a circuit for connecting a source of power with a refrigerant-producing unit, three independently operable switch mechanisms, a thermal motor connected to actuate each of the switch mechanisms, three temperature-sensitive instruments connected to the respective thermal motors two of which instruments are contactually positioned at spaced points on an evaporator and the third positioned adjacent the evaporator, a relay switch the motor of which is so connected in series with all three switches and the relay switch as to be energized by the concurrent closing of all three switches and subsequently maintained energized by the concurrent closing of the relay switch and two of the three switches in the event of a subsequent opening of one of the three switches actuated by the thermal motor connected with one of the two contactually-positioned instruments and a manually-adjustable dial element associated with each of the switch mechanisms for predetermining the relative temperature conditions in the refrigerator at which the instruments will respectively effect the operation of the switch mechanisms for controlling the operation of the refrigerant-producing unit.

4. A defrosting control comprising, a refrigerator, an evaporator located in the refrigerator and connected to a refrigerant-producing unit, an electrical circuit connecting a source of power with the unit, three independently operable switch mechanisms, a thermal motor connected to actuate each of the switch mechanisms, three temperature-sensitive instruments connected to the respective thermal motors two of which instruments are contactually positioned at spaced points on the evaporator and the third positioned adjacent the evaporator, a relay switch the motor of which is so connected in series with all three switches and the relay switch as to be energized by the concurrent closing of all three switches and subsequently maintained energized by the concurrent closing of the relay switch and two of the three switches in the event of a subsequent opening of one of the three switches actuated by the thermal motor connected with one of the two contactually-positioned instruments and manually-adjustable means for predetermining the relative temperature conditions in the refrigerator at which the instruments will respectively effect the operation of the switch mechanisms for controlling the operation of the refrigerant-producing unit.

5. A defrosting control comprising, a refrigerator, an evaporator located in the refrigerator and connected to a refrigerant-producing unit, an electrical circuit connecting a source of power with the unit, three independently operable switch mechanisms, a thermal motor connected to actuate each of the switch mechanisms, three temperature-sensitive instruments connected to the respective thermal motors two of which instruments are contactually positioned at spaced points on the evaporator and the third positioned adjacent the evaporator, a relay switch the motor of which is so connected in series with all three switches and the relay switch as to be energized by the concurrent closing of all three switches and subsequently maintained energized by the concurrent closing of the relay switch and two of the three switches in the event of a subsequent opening of one of the three switches actuated by the thermal motor connected with one of the two contactually-positioned instruments an auxiliary circuit controlled by the relay switch for neutralizing one of the three switches at the time of and during the energization of the relay, and a manually-adjustable dial element associated with each of the switch mechanisms for predetermining the relative temperature conditions in the refrigerator at which the instruments will respectively effect the operation of the switch mechanisms for controlling the operation of the refrigerant-producing unit.

6. A defrosting control comprising, a refrigerator, an evaporator located in the refrigerator and connected to a refrigerant-producing unit, an electrical circuit connecting a source of power with the unit, three independently-operable switch mechanisms, a thermal motor connected to actuate each of the three switch mechanisms, three temperature-sensitive instruments connected to the respective thermal motors two of which instruments are contactually positioned at spaced points on the evaporator and the third positioned adjacent the evaporator, a relay-operated single-throw two-pole switch the motor of which is so connected in series with all three switches and the relay switch as to be energized by the concurrent closing of all three switches and subsequently maintained energized by the concurrent closing of the relay switch and two of the three switches in the event of a subsequent opening of one of the three switches actuated by the thermal motor connected with one of the two contactually-positioned instruments, one of the poles of the relay switch being connected to control power to the refrigerant-producing unit, and a manually-adjustable dial element associated with each of the switch mechanisms for predetermining the relative temperature conditions in a refrigerator at which the instruments will respectively effect the actuation of the switch mechanisms for controlling the operation of the refrigerant-producing unit.

7. A defrosting control comprising, a refrigerator, an evaporator located in the refrigerator and connected to a refrigerant-producing unit, an electrical circuit connecting a source of power with the unit, three independently-operable switch mechanisms, a thermal motor connected to actuate each of the three switch mechanisms, three temperature-sensitive instruments connected to the respective thermal motors two of which instruments are contactually positioned at spaced points on the evaporator and the third positioned adjacent the evaporator, a relay-operated single-throw two-pole switch the motor of which is so connected in series with all three switches and the relay switch as to be energized by the concurrent closing of all three switches and subsequently maintained energized by the concurrent closing of the relay switch and two of the three switches in the event of a subsequent opening of one of the three switches actuated by the thermal motor connected with one of the two contactually-positioned instruments, one of the poles of the relay switch being connected to control power to the refrigerant-producing unit, an auxiliary circuit controlled by the other pole of the relay switch for neutralizing the switch mechanisms actuated by the temperature-sensitive instrument positioned most rearwardly on the evaporator at the time and during the energization of the relay switch, and a manually-adjustable dial element associated with each of the switch mechanisms for predetermining the relative temperature conditions in a refrigerator at which the instruments will respectively effect the actuation of the switch mechanisms for controlling the operation of the refrigerant-producing unit.

References Cited in the file of this patent

UNITED STATES PATENTS

| | | |
|---|---|---|
| 2,066,235 | Smilack | Dec. 29, 1936 |
| 2,174,776 | Buchanan | Oct. 3, 1939 |
| 2,294,028 | Grooms | Aug. 25, 1942 |
| 2,534,455 | Koontz | Dec. 19, 1950 |
| 2,667,757 | Shoemaker | Feb. 2, 1954 |